United States Patent [19]

Gerretz et al.

[11] Patent Number: 4,547,082
[45] Date of Patent: Oct. 15, 1985

[54] BEARING CONSTRUCTION OF A CRANKSHAFT OF A COLD PILGER ROLLING MILL, OR THE LIKE

[75] Inventors: Josef Gerretz, Viersen; Klaus Rehag, Monchen-Gladbach, both of Fed. Rep. of Germany

[73] Assignee: Mannesmann Demag Wean, Pittsburgh, Pa.

[21] Appl. No.: 392,492

[22] Filed: Sep. 7, 1982

[30] Foreign Application Priority Data

Jul. 7, 1981 [DE] Fed. Rep. of Germany ....... 3127198

[51] Int. Cl.⁴ .............................................. F16C 37/00
[52] U.S. Cl. .................... 384/278; 384/280; 384/320
[58] Field of Search ............... 384/280, 320, 278, 297, 384/299, 300; 277/22

[56] References Cited

U.S. PATENT DOCUMENTS

| 1,159,066 | 11/1915 | Moore | 277/22 |
| 2,721,773 | 10/1955 | Gentile et al. | 384/280 |
| 2,913,284 | 11/1959 | Zankl | 384/299 |
| 4,114,899 | 9/1978 | Külzer et al. | 277/22 |

Primary Examiner—Lenard A. Footland
Attorney, Agent, or Firm—Daniel Patch; Suzanne Kikel

[57] ABSTRACT

A bearing construction for a crankshaft of a cold Pilger rolling mill for the rolling of tubes wherein the connecting rod is attached to the mill and in which case friction is created between an abrasion bushing made from surface-hardened steel and a bearing box made of high-load or strength synthetic material. For the lubrication of the friction surfaces, the cooling fluid employed for rolling is used. For better removal of heat, the abrasion bushings are provided with means such as cooling fins or similar surface-enlarging profiles and/or materials with high thermal conductivity.

9 Claims, 4 Drawing Figures

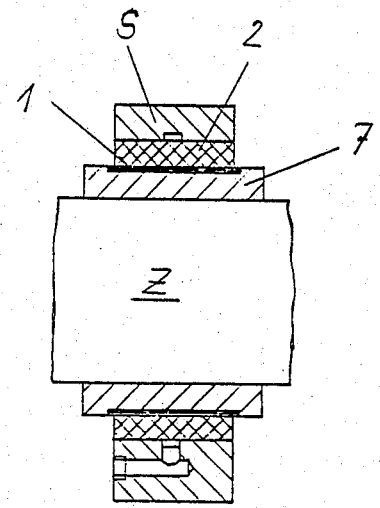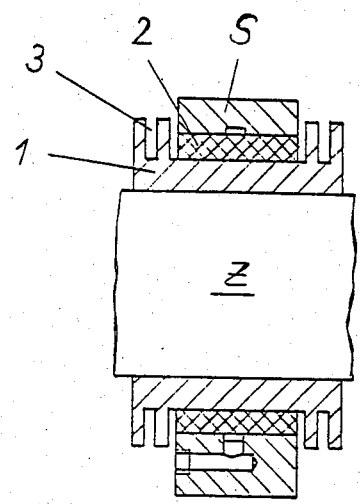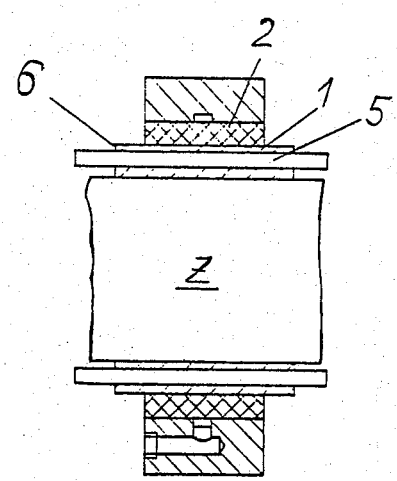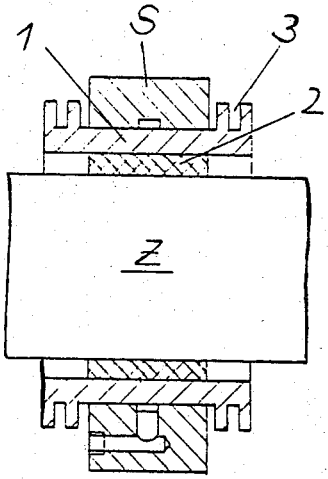

BEARING CONSTRUCTION OF A CRANKSHAFT OF A COLD PILGER ROLLING MILL, OR THE LIKE

BACKGROUND OF THE INVENTION

The invention concerns a bearing construction for a crankshaft such as the type employed in a cold Pilger rolling mill for the rolling of tubes, the connecting rods of which are each mounted in a split plain friction or sliding bearing which is provided with an abrasion bushing made of surface hardened steel and a bearing box made of high-load or strength synthetic material which bearing box furnishes the frictional surface and is provided with lubricating compartments, whereby in each case the joints of the bearing boxes are arranged at right angles to the major axis of the crank assembly and the lubricating compartments and their lubricating holes are located in the vicinity of the joints of the abrasion bushings and the cooling fluid used for rolling in the cold pilger rolling mill is used for lubricating the frictional surfaces.

It is to be appreciated that the bearing construction disclosed herein is used for connecting the connecting rod of a crankshaft to the roll housing of the pilger mill similar to that shown in U.S. Pat. No. 3,890,821. It is to be further noted, however, that this bearing construction could also be used to connect the other end of the rod to the crank, i.e. the rod to the end of the crankshaft itself.

A bearing construction of this sort mentioned above is described in German Patent Application No. P 30 13 135.2. With the proposed solution, a bearing construction is provided for a cold Pilger rolling mill, in the case of which an abrasion of the crankshaft is for the most part avoided by the fact that, as a result of the special bearing construction, the cooling fluid which is used for rolling in the cold pilger rolling mill can be used for the lubrication of the friction bearings. Consequently, the known problems are eliminated which arose as a result of the fact that a mixing of coolant and lubricant occurred in traditional bearing, which mixing brought about a high abrasion of the crank or, as the case may be, crankshaft mounting, despite the fact that there was also a thorough filtering of abrasive impurities.

An essential task of the cooling fluid for the proposed bearing construction is the removal of the heat of friction. Since a hydrodynamic lubrication cannot be achieved in the case of the bearing construction selected and since constant friction is present, particular attention must be devoted to the removal of heat. In this context, the particular construction of the lubricating grooves and lubricating compartments often does not suffice for the removal of heat by way of the cooling fluid.

SUMMARY OF THE PRESENT INVENTION

Setting out from this point, an object of the present intention is to improve the bearing construction described in German Patent Application No. P 30 13 135.2 in such a way that a particularly good removal of heat is guaranteed for the heat of friction which arises.

In accordance with the present invention, it is proposed for the solution of the aforesaid object that the abrasion bushings outside of the friction surfaces will be provided with profiles such as cooling fins or the like which enlarge their surface. These cooling fins, placed laterally beside the bearing surfaces, permit a problem-free removal or, as the case may be, transfer of the heat which arises through friction to the outside air and to the cooling fluid which is to be found in this vicinity. This cooling fluid as is known, wets all moving parts of the crankshaft assembly, so that the surface of the abrasion bearings is wetted as well.

According to another characteristic of the invention, the removal of heat can be improved by having the abrasion bushings connected to a material of high thermal conductivity. Such a composite action of the material permits the transmission of the heat of friction from the abrasion bushings which necessarily consist of high-strength material to a supporting material which possesses a better thermal conductivity.

According to another characteristic of the present invention, this supporting material can consist of heat-removing copper to which the abrasion bushings are connected.

Finally, according to another characteristic of the invention, it can be provided that the abrasion bushings are penetrated by copper bolts distributed uniformly over the circumference of the abrasion bushing. Copper bolts of this sort which are inserted solidly into holes bored into the abrasion bushings take up the heat which arises in the abrasion bushings as a result of friction and conduct it out of the bearing into the cooling fluid or, as the case may be, into the surrounding air. In this context it is advantageous if the copper bolts are arranged with axes parallel and extend away from the abrasion bushings on both sides thereof.

A particularly favorable mounting of the crankshaft results when, according to a further characteristic of the invention, it is provided that the bearings associated with the crankshaft itself be designed as friction bearings. In this case, the sealing of the traditional roller bearings is omitted and the advantages described with the present invention apply in like measure for the main bearings of the crankshaft as well.

BRIEF DESCRIPTION OF THE DRAWINGS

These and other objects of the present invention will be better appreciated and understood when the following description is read along with the drawings of which:

FIG. 1 is a sectional view of a bearing construction with an abrasion bushing provided with cooling fins; and this bearing is used for mounting a connecting rod to the side of the roll housing of the mill or to a crankshaft which reciprocates the housing.

FIG. 2 is a sectional view of another version of the abrasion bushing provided with cooling fins;

FIG. 3 is a sectional view of an abrasion bushing mounted on a copper bushing; and FIG. 4 is a sectional view of an abrasion bearing with copper bolts penetrating it.

DESCRIPTION OF A PREFERRED EMBODIMENT OF THIS INVENTION

In FIG. 1, the abrasion bushing is designated with 1; it is designed to be essentially wider than the bearing box 2 which consists of synthetic material. The abrasion bushing 1 of surface hardened steel is provided with rotary cooling fins 3 extending radially on both sides of the bearing box 2, which fins substantially enlarge the surface of the abrasion bushing 1 beyond the friction surface of the bearing. As a result of this, the heat of friction which arises between the synthetic bearing box 2 and the abrasion bushing 1, which heat is stored for the most part in the abrasion bushing 1 as a result of the poor thermal conductivity of the synthetic material of bearing box 2, is removed over the cooling fins 3 into the air or, as the case may be, into the cooling fluid which wets the fins 3.

Another version of the abrasion bushing 1 provided with cooling fins 3 is illustrated in FIG. 2. Here, the synthetic bearing box is put directly onto the journal or pivot pin Z while the abrasion bushing again of surface hardened steel is not seated on the pivot pin Z as in FIG. 1, but is connected with the connecting rod S. For this example, the removal of the heat of friction which arises between bearing box 2 and abrasion bushing 1 likewise takes place in a favorable fashion over the cooling fins 3 or, as the case may be, over the connecting rod S into the surrounding air or, as the case may be, into the cooling fluid.

Another construction of the bearing is illustrated in FIG. 3. On the pin Z, a sleeve or bushing of copper 7 is seated and fixed to resist torsion, with which the abrasion bushing 1, in which the latter can be designed to be correspondingly thin as shown, is connected. The abrasion bushing 1 consists of surface-hardened steel, which is highly heated as a result of the friction between the latter and the synthetic bearing box 2. The resulting heat is removed over the copper material (having good thermal conductivity), by reason of its exposed surfaces to the outside, where it is given off into the cooling fluid or, as the case may be, into the outside air.

FIG. 4 shows an alternative solution, in the case of which the abrasion bushing 1 is provided with bored holes distributed uniformly over the circumference and with axes parallel, through which the copper bolts 5 are guided, which adhere solidly to the interior walls of the bored holes. As is illustrated in FIG. 4, the copper bolts 5 extend out of the front sides 6 and the opposite side of the abrasion bushing 1. The resulting heat of friction is removed through the copper bolts 5 out of the abrasion bushings 1, and given off in the described fashion over the extending ends of the copper bolts 5 into the cooling fluid or, as the case may be, into the outside air.

In each of the FIGS. 1 through 4, there is shown at the bottom of each Figure a lubricating hole and channel for carrying lubricant fluid into the bearing construction.

As noted before, conventionally the bearing construction consists of split frictional bearing members in which case the lubrication pockets and ports are usually arranged in the vicinity of the split joints of the bearing construction and through which means the frictional surfaces of the bearing are lubricated.

It will be appreciated that in the illustrated embodiments, the shaft or pivot pin Z is not rotatable whereas the connecting rod is the rotating element. The manner of securing the outer and inner elements of the bearing follow well-known practice.

The subject invention finds particular application in a bearing for a crankshaft in a cold pilger rolling mill, but it can be adapted for use in a wide variety of applications requiring means for removing heat due to friction between two sliding surfaces.

In accordance with the provisions of the patent statues, we have explained the principles and operation of our invention, and have illustrated and described what we consider to represent the best embodiment thereof.

We claim:

1. A bearing construction for use in supporting a member subject to relatively high speed and/or heavy load such as certain members of a rolling mill and for mounting said mill member onto a shaft for rotation therebetween, and wherein said bearing construction is exposed to an external cooling fluid employed for the rolling mill, said construction comprising:
    a first bearing member, and
    a second bearing member made of a material that is subject to decreased performance and/or failure when subjected to excessive heat due to said high speed and/or heavy load, and having a relatively low thermal conductivity with respect to said first bearing member,
    said first bearing member made of a high strength material having a high thermal conductivity relative to said second bearing member,
    said first and second bearing members arranged concentrically with respect to each other and located concentrically between said shaft and said mill member, said first and second bearing members having slideable load carrying surfaces contacting each other which are subject to the generation of frictional heat during operation of said mill member,
    said first bearing member including cooling means having substantially similar portions extending outwardly of said first member's load carrying surface on opposite ends thereof and having sufficient exposed areas that during said operation said areas are brought into contact with said external cooling fluid to dissipate said frictional heat from said first bearing member to thereby protect said second member from said excessive heat.

2. A bearing construction according to claim 1, wherein the surface area of said first bearing member is greater than that of said second bearing member.

3. A bearing construction according to claim 1, wherein said similar portions of said cooling means consists of cooling fins which extend both in an axially and radially outwardly direction from said shaft along both sides of said mill member and said second bearing member.

4. A bearing construction according to claim 1, wherein said first bearing member is relatively thin compared to said second bearing member and said cooling means consists of a third bearing member supporting said first bearing member and having a higher thermal conductivity characteristic compared to said first bearing member and having portions extending beyond the sides of said first and second bearing members.

5. A bearing construction according to claim 1, wherein said cooling means consists of several rod members having a higher thermal conductivity characteristic compared to said first bearing member and arranged an equidistance around the circumference of said first bearing member in close proximity to said slidable surfaces of said first bearing and second bearing members.

6. A bearing construction according to claim 5, wherein said several rods are further arranged in a manner that their axis run parallel to the axis of said shaft and said bearing members and extend outwardly on both sides of said first bearing member.

7. A bearing construction, according to claims 4 or 5 wherein said rod members and said third bearing member are made of copper.

8. A bearing construction, according to claim 1, wherein said first bearing member is made of a surface hardened steel.

9. A bearing construction, according to claim 1, wherein said second bearing member is made of a synthetic heavily-stressable material.

* * * * *